United States Patent
Kim et al.

(10) Patent No.: US 9,383,450 B2
(45) Date of Patent: Jul. 5, 2016

(54) APPARATUS AND METHOD FOR GENERATING SATELLITE NAVIGATION SIGNAL BASED ON SOFTWARE

(71) Applicant: Electronics and Telecommunications Research Institute, Daejeon (KR)

(72) Inventors: Tae Hee Kim, Daejeon (KR); Sang Uk Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 842 days.

(21) Appl. No.: 13/679,985

(22) Filed: Nov. 16, 2012

(65) Prior Publication Data

US 2013/0127663 A1 May 23, 2013

(30) Foreign Application Priority Data

Nov. 18, 2011 (KR) .................. 10-2011-0120693

(51) Int. Cl.
  *G01S 19/23* (2010.01)
(52) U.S. Cl.
  CPC .................... *G01S 19/23* (2013.01)
(58) Field of Classification Search
  CPC ....................................... G01S 19/23
  See application file for complete search history.

(56) References Cited

U.S. PATENT DOCUMENTS

2006/0263755 A1 11/2006 Mori et al.

FOREIGN PATENT DOCUMENTS

KR 1020090036863 A 4/2009

OTHER PUBLICATIONS

Inone Joo; et al, "S/W based IF signal simulator prototyping for L1 C/A, L2C, and E1 (B&C)," in Information, Communications & Signal Processing, 2007 6th International Conference on , vol., no., pp. 1-4, Dec. 10-13, 2007.*
Dong, Lei et al. "Implementation and Verification of a Software-Based IF GPS Signal Simulator," National Technical Meeting, Institute of Navigation, Jan. 2004, pp. 1-12.*
Dong, Lei. "IF GPS Signal Simulator Development and Verification," Dept. of Geomatics Engineering University of Calgary, Dec. 2003, pp. 1-182.*

\* cited by examiner

*Primary Examiner* — Gregory C Issing

(57) ABSTRACT

Provided is an apparatus and method for generating a satellite navigation signal, the method including: extracting, navigation data that is a parameter required to generate a navigation message; verifying visible satellites at a current position of a receiver based on a position of the receiver and positions of satellites calculated based on navigation data; calculating a pseudo distance from each visible satellite and a Doppler of each visible satellite; calculating, as a Doppler period, a duration of time corresponding to a Doppler displacement capable of being processed at the receiver; generating a navigation message frame to generate a satellite navigation signal, based on navigation data and a TOW; and generating a satellite navigation signal of a digitized IF for each visible satellite based on the navigation message frame, the pseudo distance for each visible satellite, and the Doppler for each visible satellite during the Doppler period.

9 Claims, 5 Drawing Sheets

APPARATUS AND METHOD FOR GENERATING SATELLITE NAVIGATION SIGNAL BASED ON SOFTWARE

CROSS-REFERENCE TO RELATED APPLICATION

This application claims the priority benefit of Korean Patent Application No. 10-2011-0120693, filed on Nov. 18, 2011, in the Korean Intellectual Property Office, the disclosure of which is incorporated herein by reference.

BACKGROUND

1. Field of the Invention

The present invention relates to a signal generating simulation in a satellite navigation system, and more particularly, to a satellite navigation signal generating apparatus and method that may generate a signal for satellite navigation based on software in a satellite navigation system.

2. Description of the Related Art

Currently, with the expanding market for smart phones, various types of location based services have been provided. A global positioning system (GPS) receiving chip set embedded in a smart phone has enabled a portable mobile location service. Prior to being released in the market, a GPS receiving chip set for a smart phone needs to be verified by implementing a test in an environment similar to an actual environment. Construction of the above test environment is currently ongoing through a general method of simply relaying a signal received from a single GPS antenna to an indoor test environment through a relay. In the above environment, test verification similar to various actual environments may not be implemented.

In general, the development of a simulator for generating a satellite navigation signal has been configured to effectively verify a software navigation receiver by generating a digitized intermediate frequency signal without using a radio frequency (RF) signal processing unit that is a hardware element.

As described above, by configuring the simulator based on software instead of configuring the simulator based on hardware, flexibility and cost reduction may be achieved. However, in the case of generating a signal through the simulator based on software, a relatively large amount of time may be utilized compared to a case of generating a signal through a signal generator based on hardware.

Accordingly, there is a need for a simulator for generating a signal based on software that may reduce flexibility and cost, and may also reduce an amount of time used to generate a signal.

SUMMARY

An aspect of the present invention provides a method of generating a signal in real time in a software based satellite navigation signal generator that may differentially determine a Doppler update period required for a signal generation to be suitable for a Doppler displacement and thereby may decrease an amount of Doppler update time and also enhance a signal generation performance by generating a signal, for example, digitized intermediate frequency data based on the Doppler update period.

According to an aspect of the present invention, there is provided an apparatus for generating a satellite navigation signal based on software, the apparatus including: an orbit data processing unit to calculate, based on receiver independent exchange format (RINEX) data, visible satellite information required to generate navigation data and a signal, a pseudo distance for each visible satellite, a Doppler for each visible satellite, and a Doppler period; a navigation message processing unit to generate, for each visible satellite based on the navigation data, a navigation message frame required to generate a satellite navigation signal; and a signal generating unit to generate a satellite navigation signal of a digitized intermediate frequency for each visible satellite based on the navigation message frame for each visible satellite, the pseudo distance for each visible satellite, and the Doppler for each visible satellite during the Doppler period.

According to another aspect of the present invention, there is provided a method of generating a satellite navigation signal based on software, the method including: calculating, based on RINEX data, visible satellite information required to generate navigation data and a signal, a pseudo distance for each visible satellite, a Doppler for each visible satellite, and a Doppler period; generating, for each visible satellite based on the navigation data, a navigation message frame required to generate a satellite navigation signal; and generating a satellite navigation signal of a digitized intermediate frequency for each visible satellite based on the navigation message frame for each visible satellite, the pseudo distance for each visible satellite, and the Doppler for each visible satellite during the Doppler period.

According to still another aspect of the present invention, there is provided a method of generating a satellite navigation signal based on software, the method including: extracting, from RINEX data, navigation data that is a parameter required to generate a navigation message; verifying visible satellites at a current position of a receiver based on a position of the receiver and positions of satellites that are calculated based on the navigation data; calculating a pseudo distance from each of the visible satellites and a Doppler of each of the visible satellites; calculating, as a Doppler period, a duration of time corresponding to a Doppler displacement that is capable of being processed at the receiver; generating a navigation message frame required to generate a satellite navigation signal, based on the navigation data and a time of week (TOW); and generating a satellite navigation signal of a digitized intermediate frequency for each visible satellite based on the navigation message frame, the pseudo distance for each visible satellite, and the Doppler for each visible satellite during the Doppler period.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Figure 1:
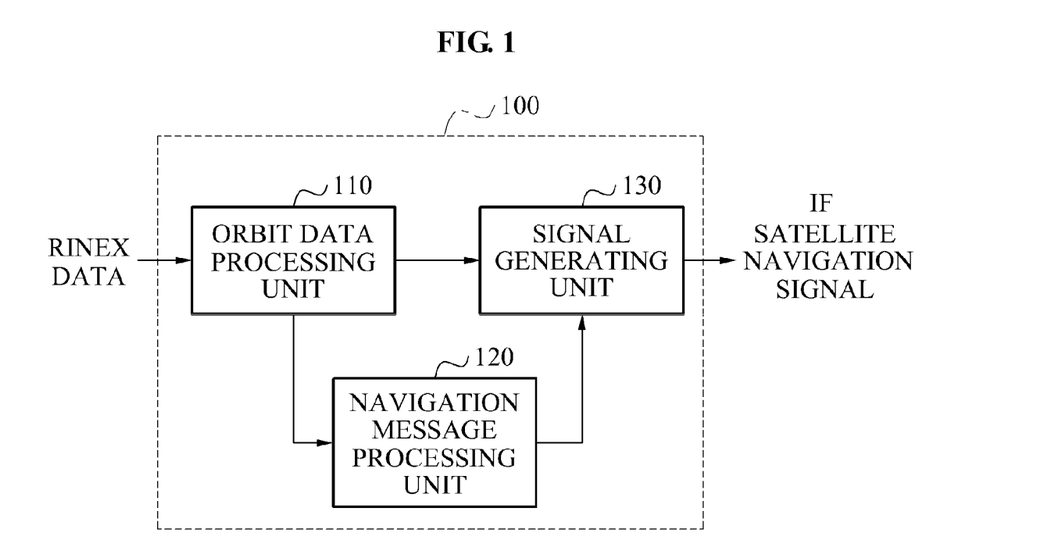
FIG. 1 is a block diagram illustrating a configuration of an apparatus for generating a satellite navigation signal according to an embodiment of the present invention.

FIG. 1 is a block diagram illustrating a configuration of an apparatus 100 for generating a satellite navigation signal according to an embodiment of the present invention.

Referring to FIG. 1, the satellite navigation signal generating apparatus 100 may include an orbit data processing unit 110, a navigation message processing unit 120, and a signal generating unit 130.

The orbit data processing unit 110 may calculate, based on receiver independent exchange format (RINEX) data, visible satellite information required to generate navigation data and a signal, a pseudo distance for each visible satellite, a Doppler for each visible satellite, and a Doppler period.

The navigation message processing unit 120 may generate, for each visible satellite, a navigation message frame required to generate a satellite navigation signal, based on the navigation data received from the orbit data processing unit 110.

The signal generating unit 130 may generate a satellite navigation signal of a digitized intermediate frequency (IF) for each visible satellite based on the navigation message frame for each visible satellite, the pseudo distance for each visible satellite, and the Doppler for each visible satellite during the Doppler period.

Figure 2:
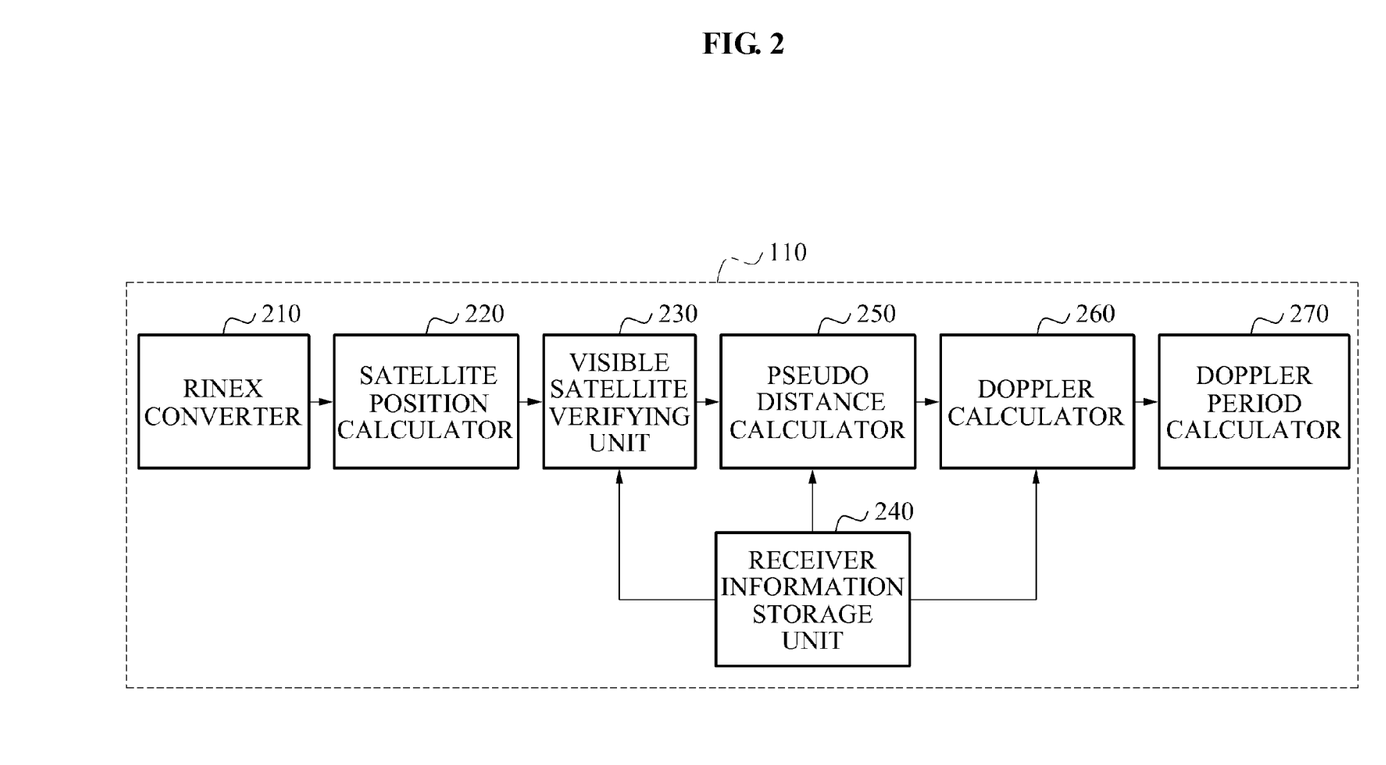
FIG. 2 is a block diagram illustrating a configuration of an orbit data processing unit in a satellite navigation signal processing apparatus according to an embodiment of the present invention.

FIG. 2 is a block diagram illustrating a configuration of an orbit data processing unit 110 in a satellite navigation signal processing apparatus according to an embodiment of the present invention.

Referring to FIG. 2, the orbit data processing unit 100 may include a RINEX converter 210, a satellite position calculator 220, a visible satellite verifying unit 230, a receiver information storage unit 240, a pseudo distance calculator 250, a Doppler calculator 260, and a Doppler period calculator 270.

The RINEX converter 210 may receive RINEX data, and may extract, from the RINEX data, the navigation data that is a parameter required to generate a navigation message.

The satellite position calculator 220 may calculate positions of satellites based on the navigation data that is extracted by the RINEX converter 210.

The visible satellite verifying unit 230 may verify visible satellites at a position of a receiver based on a position of the receiver and the positions of the satellites calculated by the satellite position calculator 220. Here, the visible satellite verifying unit 230 may determine a visible satellite at predetermined intervals. For example, a satellite having an elevation of at least a predetermined angle, for example, 10 degrees at a user position may be verified as the visible satellite.

The receiver information storage unit 240 may store receiver information about the position of the receiver that receives a satellite navigation signal for a simulation.

The pseudo distance calculator 250 may calculate a pseudo distance from each of the visible satellites based on the receiver information.

The Doppler calculator 260 may calculate a Doppler of each of the visible satellites based on the receiver information.

The Doppler period calculator 270 may calculate, as the Doppler period, a duration of time corresponding to a Doppler displacement that is capable of being processed at the receiver.

Figure 3:
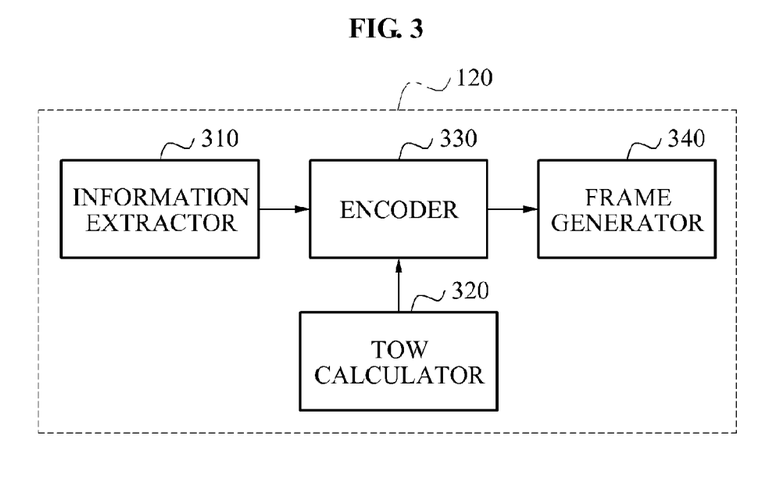
FIG. 3 is a block diagram illustrating a configuration of a navigation message processing unit in a satellite navigation signal processing apparatus according to an embodiment of the present invention.

FIG. 3 is a block diagram illustrating a configuration of a navigation message processing unit 120 in a satellite navigation signal processing apparatus according to an embodiment of the present invention.

Referring to FIG. 3, the navigation message processing unit 120 may include an information extractor 310, a time of week (TOW) calculator 320, an encoder 330, and a frame generator 340.

The information extractor 310 may extract, for each visible satellite, orbit information and error information, required to generate a navigation message, from navigation data that is received from the orbit data processing unit 110.

The TOW calculator 320 may calculate a TOW indicating a transmission time in which each of subframes constituting a navigation message is transmitted, based on a signal generation time that is initially determined by a user.

The encoder 330 may perform encoding for generating the navigation data frame for each visible satellite based on the TOW, the orbit information, and the error information. Here, encoding indicates an operation of bit-converting data to a frame format defined in the satellite navigation system, for example, a global positioning system (GPS). The TOW calculated by the TOW calculator 320 may be inserted into each subframe.

The encoder 330 may generate encoding data based on a word unit that constitutes a subframe.

The frame generator 340 may generate, for each visible satellite based on encoding data generated by the encoder 330, the navigation message frame that includes subframes.

Figure 4:
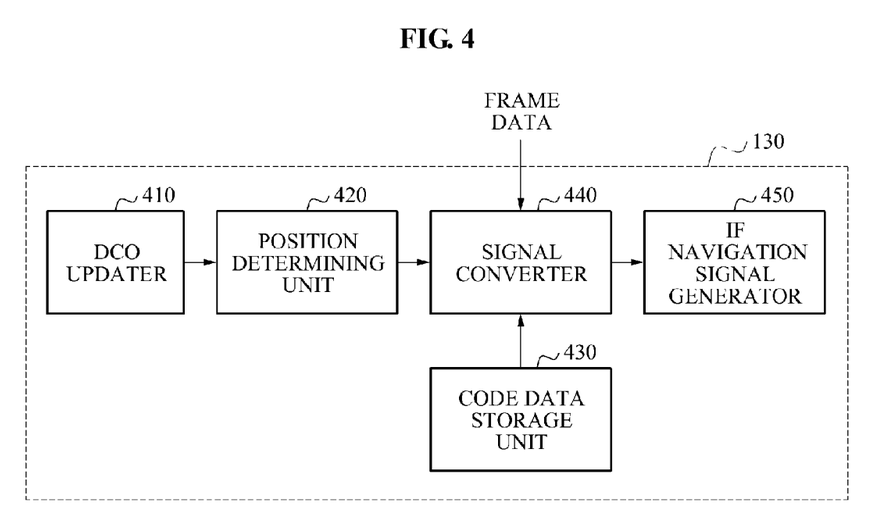
FIG. 4 is a block diagram illustrating a configuration of a signal generating unit in a satellite navigation signal processing apparatus according to an embodiment of the present invention.

FIG. 4 is a block diagram illustrating a configuration of a signal generating unit 130 in a satellite navigation signal processing apparatus according to an embodiment of the present invention.

Referring to FIG. 4, the signal generating unit 130 may include a digital controlled oscillator (DCO) updater 410, a position determining unit 420, a code data storage unit 430, a signal converter 430, and an IF navigation signal generator 450.

The DCO updater 410 may update a code DCO and a carrier DCO for each visible satellite using the Doppler for each visible satellite that is received from the orbit data processing unit 110.

The position determining unit 420 may determine a position of the navigation message frame and a position of code data required to reflect the pseudo distance for each visible satellite in a signal.

The code data storage unit 430 may store code data predetermined for each satellite.

The signal converter 440 may generate a satellite navigation signal for each visible satellite by reading a value corresponding to the position of the code data and a value corresponding to the position of the navigation message frame code data corresponding to a visible satellite, stored in the code data storage unit 430, and the navigation message frame for each visible satellite, received from the navigation message processing unit 120, respectively, and by multiplying the read values.

The IF navigation signal generating unit 450 may generate the satellite navigation signal of the digitized IF for each visible satellite by multiplying a predetermined IF carrier and the satellite navigation signal for each visible satellite.

The code DCO and the carrier DCO required to generate a signal in the signal generating unit 130 may be determined based on a Doppler component of a satellite that is periodically calculated. That is, the signal generating unit 130 may periodically update the code DCO and the carrier DCO by applying, to the code DCO and the carrier DCO, the Doppler component calculated by the orbit data processing unit 110. In this instance, the period may be an important factor to determine a characteristic of a signal. Therefore, when the period is too short, an amount of calculation may increase, thereby using a relatively large amount of time. On the contrary, when the period is too long, the characteristic of the signal may not be appropriately reflected and thus, the receiver may fail to process the corresponding signal. Accordingly, the signal generating unit 130 may require an appropriate DCO update period in which a Doppler displacement that is capable of being processed at the receiver is applied.

When a signal generation channel performs a call based on a sample unit, a relatively large amount of time may be used for the call.

To enhance performance of a signal generation time and to decrease a large amount of time used by the above call based on the sample unit, sample data corresponding to a Doppler period that is a DCO update period may need to be processed based on a block unit.

When sample data is processed based on the block unit, sample data corresponding to the Doppler period may be processed only by calling a signal generation function once. A DCO parameter that affects the generation of a code and a carrier may be maintained to have the same value during a generation time. Accordingly, a signal generation processing rate may be enhanced by processing sample data while the DOC parameter maintains the same value.

A Doppler displacement capable of being processed at the receiver may be a few Hz per second. Accordingly, when the satellite navigation signal generating apparatus 100 generates a satellite navigation signal by reflecting a Doppler with respect to a satellite movement, processing load occurring due to Doppler calculation may be reduced by applying a Doppler displacement to a Doppler period for calculating a Doppler and thereby determining the Doppler period. Here, the Doppler displacement indicates a displacement level of Doppler capable of being processed at the receiver.

Figure 5:
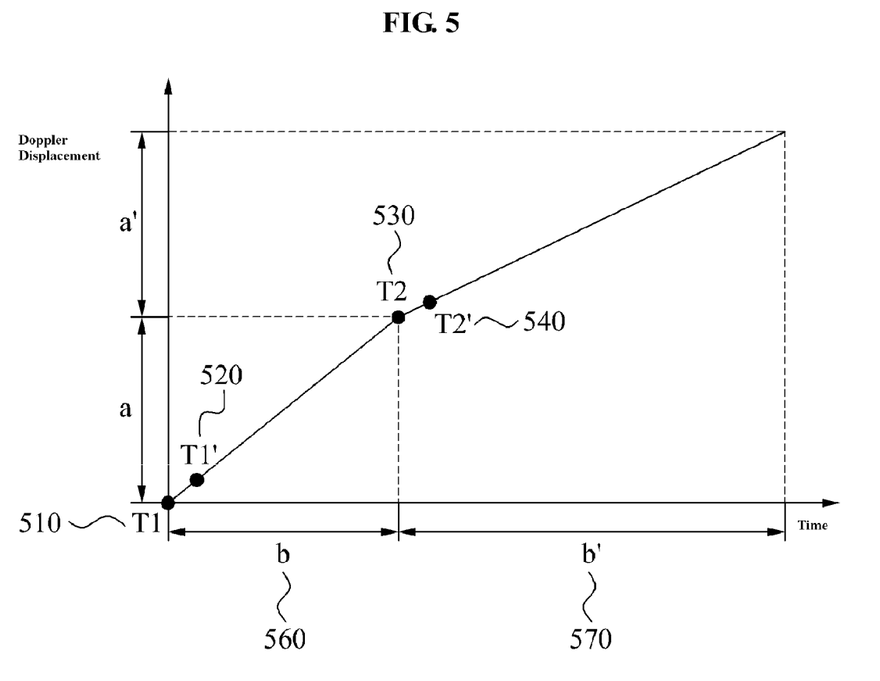
FIG. 5 is a graph to describe an example of determining a Doppler period for generating a satellite navigation signal according to an embodiment of the present invention.

FIG. 5 is a graph to describe an example of determining a Doppler period for generating a satellite navigation signal according to an embodiment of the present invention.

Referring to FIG. 5, to calculate a Doppler between a current satellite and a receiver at a signal generation point in time T1 510, a Doppler value at a point in time T1' 520 after a predetermined period of time is elapsed from T1 510 may be utilized.

That is, a Doppler period b 560 that is a duration of time in which the Doppler corresponding to T1 is maintained may be determined based on the Doppler value at T1' 520.

In an example of FIG. 5, Doppler values at T1 510 and T1' 520 are maintained to be the same by a point in time T2 530. Accordingly, the Doppler period b 560 in which the Doppler is maintained may be determined according to Equation 1:

$$b = a/(T1\text{'\_doppler} - T1\text{\_doppler}) \quad \text{[Equation 1]}$$

Here, b denotes the Doppler period, a denotes a predetermined Doppler displacement, T1_doppler denotes a Doppler value at T1, and T1'_doppler denotes a Doppler value at T1' after a predetermined period of time is elapsed from T1.

By applying the aforementioned method, a duration of time b' 570 in which the Doppler value at T2 530 is maintained may be determined based on a Doppler value at a point in time T2 540 after a predetermined period of time is elapsed from T2 530.

Using b 560 and b' 570 in which the Doppler is maintained, the satellite navigation signal generating apparatus 100 may perform Doppler calculation for signal generation differentially according to on a Doppler displacement. Therefore, the satellite navigation signal generating apparatus 100 may decrease processing load for the Doppler calculation, and may generate a more accurate and stable signal. Also, the satellite navigation signal generating apparatus 100 may generate a signal in real time based on software and may decrease calculation load.

Hereinafter, a method of generating a satellite navigation signal based on software constructed as above according to the present invention will be described.

Figure 6:
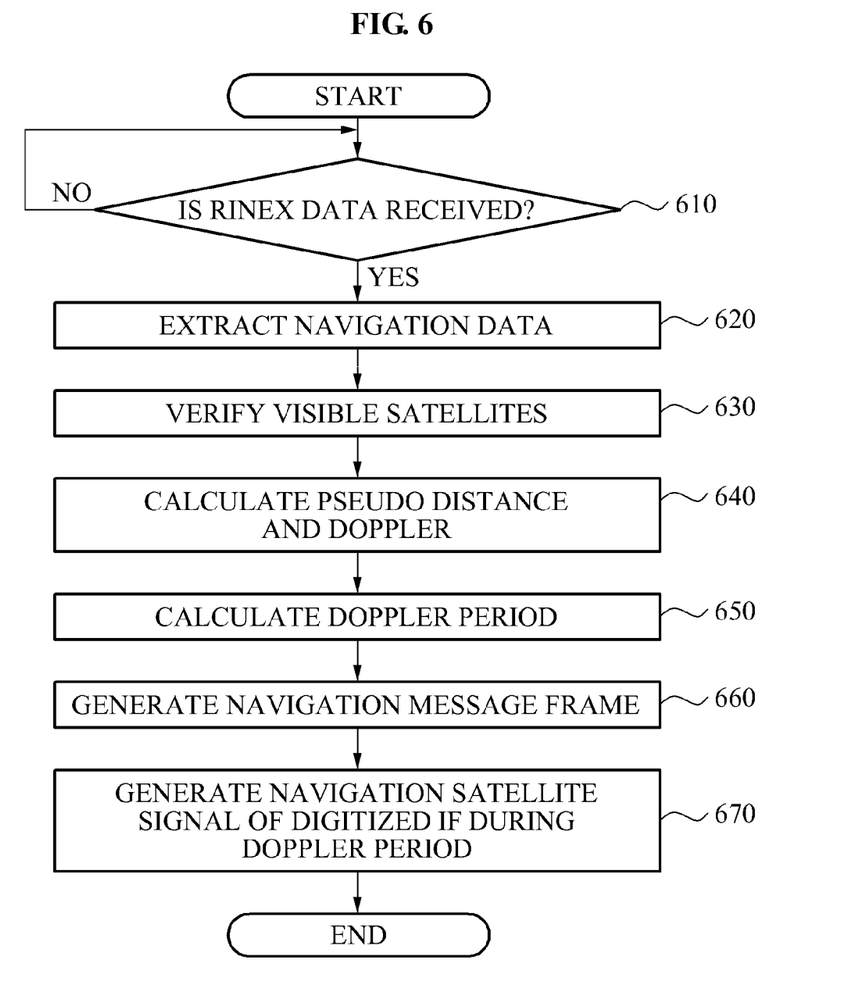
FIG. 6 is a flowchart illustrating a process of generating a satellite navigation signal in a satellite navigation signal generating apparatus according to an embodiment of the present invention.

FIG. 6 is a flowchart illustrating a process of generating a satellite navigation signal in a satellite navigation signal generating apparatus according to an embodiment of the present invention.

Referring to FIG. 6, when the satellite navigation signal generating apparatus 100 receives RINEX data in operation 610, the satellite navigation signal generating apparatus 100 may extract, from the received RINEX data, navigation data that is a parameter required to generate a navigation message in operation 620.

In operation 630, the satellite navigation signal generating apparatus 100 may verify visible satellites at a current position of a receiver based on a position of the receiver and positions of satellites that are calculated based on the navigation data.

In operation 640, the satellite navigation signal generating apparatus 100 may calculate a pseudo distance from each of the visible satellites and a Doppler of each of the visible satellites.

In operation 650, the satellite navigation signal generating apparatus 100 may calculate, as the Doppler period, a duration of time corresponding to a Doppler displacement that is capable of being processed at the receiver.

In operation 660, the satellite navigation signal generating apparatus 100 may generate a navigation message frame required to generate a satellite navigation signal, based on the navigation data and a TOW.

In operation 670, the satellite navigation signal generating apparatus 100 may generate a satellite navigation signal of a digitized IF for each visible satellite based on the navigation message frame, the pseudo distance for each visible satellite, and the Doppler for each visible satellite during the Doppler period.

The above-described exemplary embodiments of the present invention may be recorded in computer-readable media including program instructions to implement various operations embodied by a computer. The media may also include, alone or in combination with the program instructions, data files, data structures, and the like. The program instructions stored in the media may be specially designed and configured for the present invention, or may be known to those skilled in the art.

According to embodiments of the present invention, there may be provided an apparatus and method for generating a satellite navigation signal based on software. Therefore, it is possible to reduce an amount time used for Doppler calculation by differentially applying a Doppler period based on a Doppler displacement while maintaining a traceable Doppler displacement at a receiver.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An apparatus for generating a satellite navigation signal based on software, the apparatus comprising:
   an orbit data processing unit to calculate, based on receiver independent exchange format (RINEX) data, (i) visible satellite information, (ii) navigation data, (iii) a pseudo distance for each visible satellite, (iv) a Doppler for each visible satellite, and (v) a Doppler period;
   a navigation message processing unit to generate, for each visible satellite based on the navigation data, a navigation message frame required to generate a satellite navigation signal; and
   a signal generating unit to generate a satellite navigation signal of a digitized intermediate frequency for each visible satellite based on (i) the navigation message frame for each visible satellite, (ii) the pseudo distance for each visible satellite, and (iii) the Doppler for each visible satellite during the Doppler period,
   wherein the signal generating unit includes at least one Digitally Controlled Oscillator (DCO) used to generate the satellite navigation signal, and
   wherein the Doppler period calculator calculates the Doppler period according to equation:

$$b = a/(T1'\_doppler - T1\_doppler)$$

where b denotes a duration of a Doppler period, a denotes a predetermined Doppler displacement, T1_doppler denotes a Doppler value at a first time T1, and T1'_doppler denotes a Doppler value at a second time T1', and wherein the second time T1' occurs after a predetermined period of time is elapsed from the first time T1.

2. The apparatus of claim 1, wherein the orbit data processing unit comprises:
   a RINEX converter to extract, from the RINEX data, the navigation data that is a parameter required to generate a navigation message;
   a satellite position calculator to calculate positions of satellites based on the navigation data;
   a visible satellite verifying unit to verify visible satellites at a position of a receiver based on the position of the receiver and the calculated positions of the satellites;
   a pseudo distance calculator to calculate a pseudo distance from each of the visible satellites based on the position of the receiver;
   a Doppler calculator to calculate a Doppler of each of the visible satellites based on the position of the receiver; and
   a Doppler period calculator to calculate, as the Doppler period, a duration of time corresponding to a Doppler displacement that is capable of being processed at the receiver.

3. The apparatus of claim 1, wherein the navigation message processing unit comprises:
   an information extractor to extract, for each visible satellite, orbit information and error information from the navigation data;
   a time of week (TOW) calculator to calculate a TOW indicating a transmission time of a subframe;
   an encoder to perform encoding for generating the navigation data frame for each visible satellite based on the TOW, the orbit information, and the error information; and
   a frame generator to generate, for each visible satellite based on encoding data generated by the encoder, the navigation message frame that includes subframes.

4. The apparatus of claim 1, wherein the signal generating unit comprises:
   a digital controlled oscillator (DCO) updater to update a code DCO and a carrier DCO for each visible satellite using the Doppler for each visible satellite;
   a position determining unit to determine, for each visible satellite according to the respective pseudo distance for each visible satellite, a position in a signal of the respective navigation message frame and a position in the signal of code data;
   a signal converter to generate a satellite navigation signal for each visible satellite by reading a value corresponding to the position of the code data and a value corresponding to the position of the navigation message frame code data corresponding to a visible satellite and the navigation message frame for each visible satellite, respectively, and by multiplying the read values; and
   an intermediate frequency navigation signal generator to generate the satellite navigation signal of the digitized intermediate frequency for each visible satellite by multiplying a predetermined intermediate frequency carrier and the satellite navigation signal for each visible satellite.

5. A method of generating a satellite navigation signal based on software, the method comprising:
   calculating, based on receiver independent exchange format (RINEX) data, (i) visible satellite information, (ii) navigation data, (iii) a pseudo distance for each visible satellite, (iv) a Doppler for each visible satellite, and (v) a Doppler period;
   generating, for each visible satellite based on the navigation data, a navigation message frame required to generate a satellite navigation signal; and
   generating, using at least one Digital Controlled Oscillator (DCO), a satellite navigation signal of a digitized intermediate frequency for each visible satellite based on (i) the navigation message frame for each visible satellite, (ii) the pseudo distance for each visible satellite, and (iii) the Doppler for each visible satellite during the Doppler period,
   wherein the Doppler period is calculated according to equation:

$$b = a/(T1'\_doppler - T1\_doppler)$$

where b denotes a duration of a Doppler period, a denotes a predetermined Doppler displacement, T1_doppler denotes a Doppler value at a first time T1, and T1'_doppler denotes a Doppler value at a second time T1', and wherein the second time T1' occurs after a predetermined period of time is elapsed from the first time T1.

6. The method of claim 5, wherein the calculating comprises:
   extracting, from the RINEX data, the navigation data that is a parameter required to generate a navigation message;

calculating positions of satellites based on the navigation data;

verifying visible satellites at a position of a receiver based on a position of the receiver and the calculated positions of the satellites;

calculating a pseudo distance from each of the visible satellites based on the position of the receiver;

calculating a Doppler of each of the visible satellites based on the position of the receiver; and calculating, as the Doppler period, a duration of time corresponding to a Doppler displacement that is capable of being processed at the receiver.

7. The method of claim 5, wherein the generating of the navigation message frame comprises:

extracting, for each visible satellite, orbit information and error information from the navigation data;

calculating a time of week (TOW) indicating a transmission time of a subframe;

generating encoding data by performing encoding for generating the navigation data frame for each visible satellite based on the TOW, the orbit information, and the error information; and generating, for each visible satellite based on the encoding data, the navigation message frame that includes subframes.

8. The method of claim 5, wherein the generating of the navigation satellite signal comprises:

updating a code digital controlled oscillator (DCO) and a carrier DCO for each visible satellite using the Doppler for each visible satellite;

determining, for each visible satellite according to the respective pseudo distance for each visible satellite, a position in a signal of the navigation message frame and a position in the signal of code data;

generating a satellite navigation signal for each visible satellite by reading a value corresponding to the position of the code data and a value corresponding to the position of the navigation message frame code data corresponding to a visible satellite and the navigation message frame for each visible satellite, respectively, and by multiplying the read values; and generating the satellite navigation signal of the digitized intermediate frequency for each visible satellite by multiplying a predetermined intermediate frequency carrier and the satellite navigation signal for each visible satellite.

9. A method of generating a satellite navigation signal based on software, the method comprising:

extracting, from receiver independent exchange format (RINEX) data, navigation data that is a parameter required to generate a navigation message;

verifying visible satellites at a current position of a receiver based on a position of the receiver and positions of satellites that are calculated based on the navigation data;

calculating a pseudo distance from each of the visible satellites and a Doppler of each of the visible satellites;

calculating, as a Doppler period, a duration of time corresponding to a Doppler displacement that is capable of being processed at the receiver;

generating a navigation message frame required to generate a satellite navigation signal, based on the navigation data and a time of week (TOW); and generating, using at least one Digital Controlled Oscillator (DCO), a satellite navigation signal of a digitized intermediate frequency for each visible satellite based on the navigation message frame, the pseudo distance for each visible satellite, and the Doppler for each visible satellite during the Doppler period, wherein the Doppler period is calculated according to equation:

$$b = a/(T1'\_doppler - T1\_doppler)$$

where b denotes a duration of a Doppler period, a denotes a predetermined Doppler displacement, T1_doppler denotes a Doppler value at a first time T1, and T1'_doppler denotes a Doppler value at a second time T1', and wherein the second time T1' occurs after a predetermined period of time is elapsed from the first time T1.

* * * * *